INVENTOR
ROBERT N. KNOSP

INVENTOR
ROBERT N. KNOSP
ATTORNEYS

INVENTOR
ROBERT N. KNOSP
BY
Wood, Herron & Evans.
ATTORNEYS

INVENTOR
ROBERT N. KNOSP
BY
Wood, Herron & Evans.
ATTORNEYS

United States Patent Office 3,224,297
Patented Dec. 21, 1965

3,224,297
DIFFERENTIAL DRIVE FOR POSITIONING THE SHIFTABLE MEMBER OF A MACHINE TOOL
Robert N. Knosp, Ludlow, Ky., assignor to The Fosdick Machine Tool Company, Cincinnati, Ohio, a corporation of Ohio
Original application Sept. 5, 1961, Ser. No. 135,879, now Patent No. 3,171,301, dated Mar. 2, 1965. Divided and this application Feb. 10, 1964, Ser. No. 352,706
3 Claims. (Cl. 74—675)

This invention relates to machine tools of the type having a column upon which is slidably mounted in a drill head or the like, and is directed particularly to an apparatus for precisely controlling, in an automatic manner, the vertical position of the drill head with respect to the column. The present application is a division of the pending application of Robert N. Knosp entitled "Automatic Head Positioning Apparatus for Machine Tools," Serial No. 135,879, which was filed on September 5, 1961, now Patent No. 3,171,301.

The present head positioning apparatus is disclosed in relation to the jig boring head or drill head of a jig boring machine which is used in drilling, counter-boring, and similar machining operations which involve the precise location of the holes with respect to the workpiece, and also precise control of the depth of the hole, counter-bore or the like. A jig boring machine of this type, in general, comprises a stationary bed including a column which slidably mounts the jig boring head for vertical motion. The bed includes a saddle or cross slide mounted below the head and shiftable along one coordinate or path of motion with respect to the bed. Slidably mounted upon the saddle is a work table which is movable relative to the saddle along a second coordinate at right angles to the coordinate of motion of the saddle.

A rotatable tool spindle is mounted in the head for axial motion with respect to a workpiece clamped upon the table, such that a hole center may be precisely aligned with a spindle and its tool by the combined movements of the saddle and table. During the machining operation, the spindle, which is mounted for rotation within an axially shiftable quill, is rotated at a preselected cutting speed and is fed downwardly at a predetermined feed rate with respect to the head by axial motion of the quill with respect to the head.

An apparatus for locating the hole centers automatically with respect to the axis of the spindle is disclosed in Patent No. 2,932,088, issued to Robert N. Knosp, the present applicant. A numerical control system which provides complete automatic regulation of the functions of a jig boring machine is disclosed in the co-pending patent application of Robert N. Knosp et al., Serial No. 786,589, filed January 13, 1959, now Patent No. 3,109,329. This apparatus, operated under tape control or the like, regulates the table and saddle positioning motion in an automatic manner so as to locate the hole center with respect to the axis of the tool. The numerical control system also provides automatic selection of the spindle speed rates, spindle feed rates, and automatic selection of tools performing different types of machining operations on a given workpiece.

During any automatic machining operation of this character under tape control, a great deal of time is lost as the spindle is advanced and retracted with respect to the head at the relatively slow feed rate which is used during an automatic cutting operation. In order to avoid this loss of time, an automatic spindle feed apparatus has been developed which provides a two-stage spindle feed cycle, the first stage providing rapid advancement of the spindle from a retracted position, the second stage providing advancement of the spindle and its tool at a slower preselected feed rate to a predetermined depth with respect to the work. The spindle control apparatus is disclosed in another co-pending application of Robert N. Knosp et al., Serial No. 51,023, filed on August 22, 1960, now Patent No. 3,100,406. The automatic spindle control apparatus is interconnected with the numerical control system (Patent No. 3,109,329), such that the spindle feed cycle is also carried out automatically, along with the other machine functions, under tape control.

It will be understood that the axial spindle and quill travel relative to the drill head is limited by the length of the quill. By way of example, a given machine may provide a practical axial spindle feed motion which is less than the difference in the planes of the workpiece which is being machined. By way of example, if the workpiece includes work surfaces spaced vertically in the neighborhood of eight or more inches from one another, then it is necessary to shift the drill head vertically along the column in order to compensate for the limits of spindle travel when the higher or lower plane is to be machined.

One of the primary objectives of the present invention has been to provide an apparatus for shifting the drill head to predetermined elevations along the column in an automatic manner to compensate for the various planes of a given workpiece, thereby to eliminate the time which is normally consumed in readjusting the head manually.

Another objective has been to provide a simplified system of gauges, and an associated sensing apparatus arranged to locate the head precisely at a predetermined elevation as determined by physical contact with a precisely located gauging surface.

Described generally, the present head positioning apparatus includes a series of gauging elements disposed one above the other and mounted upon a gauge carriage which is shiftable vertically, within limits, during a gauging cycle. A cross head element is interconnected with a drill head so as to move vertically in unison with the head relative to the gauging elements. The gauging elements include abutment surfaces which are spaced apart from one another in precise planes, for example one-inch apart, so as to locate the drill head precisely at selected one-inch levels with respect to the surface of the workpiece.

During a positioning cycle, a traverse motor shifts the drill head and cross head vertically at a rapid rate toward a preselected gauge surface so as to locate the head approximately at the preselected elevation. Thereafter, the traverse motor is decommissioned and a slow speed positioning motor shifts the drill head and cross head upwardly at a slow positioning rate. As the drill head approaches its final position at this slow rate, an abutment, carried by the cross head engages the lower surface of the selected gauge element, thereby to shift the stacked gauges and gauge carriage upwardly.

A motion-amplifying compound lever system is interposed between one of the gauging surfaces and a final positioning switch; the switch in turn is interconnected with a control system, the arrangement being such that the positioning switch is tripped to stop the positioning motor precisely at a final head position. The head is then clamped to the column and the quill and spindle are fed relative to the head at its traverse end feed rates to the predetermined depth. The head positioning apparatus of the present invention is adapted to be controlled, along with the other machine functions, by the numerical control system disclosed in Patent No. 3,109,329, noted above.

A further objective of the invention has been to provide a simplified transmission system for interconnecting the rapid traverse motor and positioning motor with the drill head without the use of clutches or other elements which would normally be necessary in order to couple the respective motors individually to the head elevating mechanism.

According to this aspect of the invention, the traverse and positioning motors are both in driving connection with a differential type gear train, including planetary gears journalled in a differential cage. The differential cage is keyed to an output shaft which includes a pinion journalled within the head and meshing with a rack secured to the column. When the traverse motor is energized, the positioning motor is deenergized, such that the planetary gears react against the positioning drive system to rotate the differential cage, output shaft and pinion at the rapid traverse rate. When the positioning motor is energized, the traverse motor is deenergized, causing the planetary gear of the positioning drive to react against the traverse drive so as to rotate the differential cage, output shaft and pinion at the slow positioning rate.

The various features and advantages of the invention will be more clearly apparent to those skilled in the art from the following description taken in conjunction with the drawings.

*Machine and operation generally*

Figure 1:
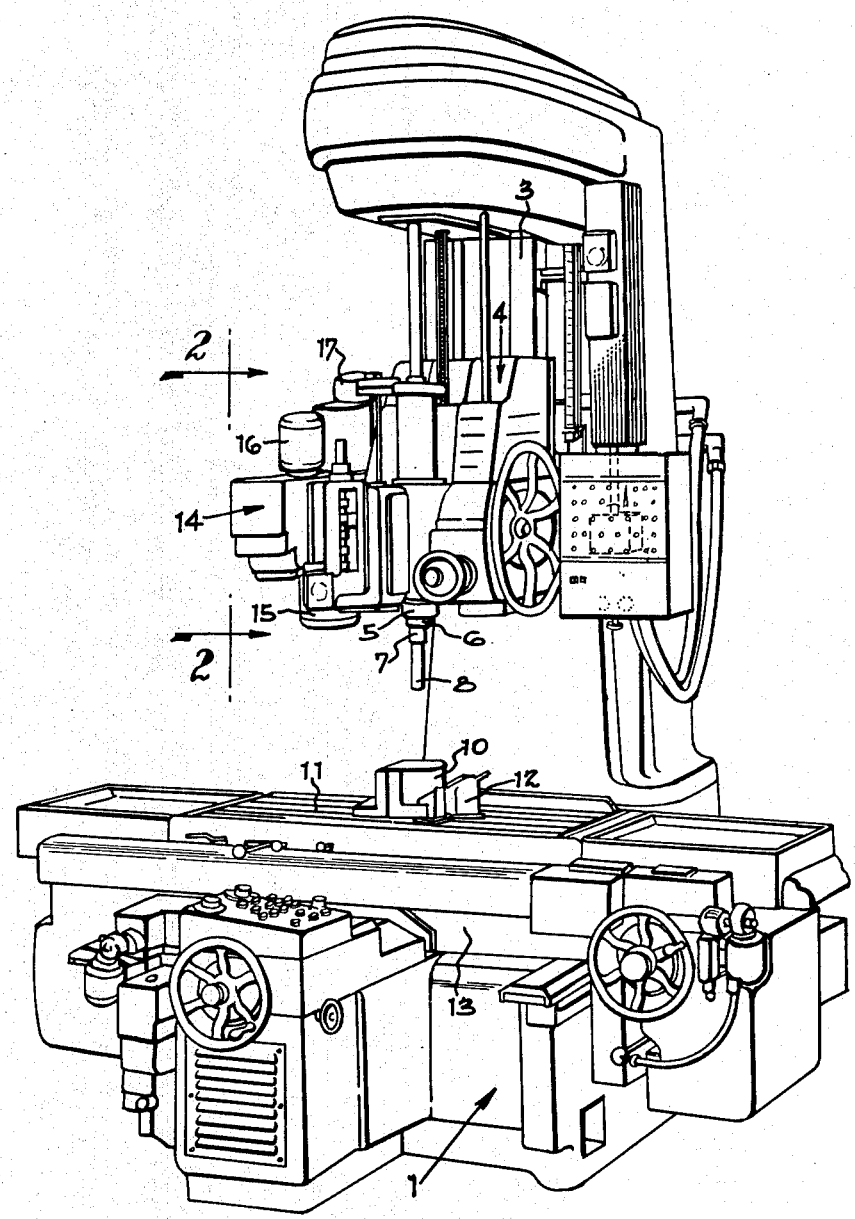
FIGURE 1 is a general perspective view of a numerically controlled jig boring machine equipped with the head positioning apparatus of this invention.

Described generally with reference to FIGURE 1, a jig boring machine embodying the present head positioning apparatus comprises a bed 1 having a column 2 rising upwardly from its rearward side, and having ways 3 slidably confining the drill head or jig boring head 4 for vertical motion relative to the bed. The vertical position of the drill head relative to the bed is regulated by the head positioning mechanism of this invention, as described in detail later.

The drill head 4 includes a vertically slidable quill 5 which includes a spindle 6 rotatably mounted within the quill. The lower end of the spindle, which projects from the quill, includes a chuck 7 of conventional design, in which is mounted a selected tool indicated at 8. The tool 8 may represent a drill, reamer, counter-boring tool or the like. It will be understood, that in machining a plurality of holes in a given workpiece, involving different operations or different hole diameters, it is necessary to mount various tools in the spindle for the several different operations.

The machine includes a variable feed transmission or feed box (not shown) which is in driving connection with the quill and which feeds the quill, spindle and tool axially at a predetermined rate. The machine also includes a variable speed spindle transmission (not shown) which rotates the spindle at a selected rate. The rate of tool feed and speed for a given machining operation is selected under tape control, as shown in the aforesaid Patent No. 3,109,329. The tape control apparatus also regulates the depth of the machining operation, utilizing the spindle control apparatus disclosed in Patent No. 3,100,406, which stops the spindle precisely at a predetermined depth.

During a machining or jig boring operation, the workpiece indicated at 10, is clamped upon a work table 11 by a suitable fixture 12, as indicated in FIGURE 1. The table 11 is slidably mounted for longitudinal motion upon a cross slide or saddle 13. The saddle, in turn, is slidably mounted upon the bed 1 of the machine for motion toward or from the column 2, at right angles to the path of motion of the table.

At the start of a given operation under tape control, the workpiece 10 is positioned with respect to the axis of the tool by the combined positioning movements of the saddle and table along the two coordinated paths of motion of the saddle and table. Thus the saddle (carrying the table) is shifted along a line transverse to the bed 1, carrying with it the work table 11 and workpiece. The table in turn, is shifted along the saddle in a path parallel with the bed of the machine thereby locating a given point on the workpiece precisely in alignment with the axis of the tool 8.

Upon completion of the positioning cycle, the tool is fed into the workpiece at the predetermined speed and feed rates provided by the numerical control system, as noted above. It will be understood at this point, that the spindle control apparatus (Patent No. 3,100,406) is capable of stopping the axial tool feed precisely at the preselected depth. After the control apparatus stops the downward tool feed, the quill, spindle and tool, as a unit, is retracted to an elevated position in preparation for the next positioning cycle under numerical control.

The present head control apparatus is arranged to locate the drill head 4 at predetermined elevations with respect to the surface of the work table to compensate for major differences in the planes of the workpiece 10, since the axial feed motion of the quill relative to the head is limited. By way of example, the total axial quill motion may be in the neighborhood of eight inches from the retracted to the extended position. Therefore, if the next plane of the workpiece to be machined lies at an elevation which is lower than the practical range of axial quill travel, then it is necessary to lower the drill head 4 along column 2 a sufficient distance to compensate for the plane of the next surface to be machined. When this condition is encountered, then the numerical control system sends an electrical impulse which causes the drill head to be lowered the required distance relative to the work surface. It will be understood that if the next work plane is higher, then the drill head will be raised a corresponding distance to compensate for the plane of the work in the same manner.

As shown generally in FIGURE 1, the drill head includes a positioning transmission enclosed in a housing indicated generally at 14, which includes a suitable driving connection for raising or lowering the drill head relative to the column 2. This transmission is arranged to shift the drill head in either direction along the major portion of its travel at a rapid traverse rate and to bring the head to its final position under a slow positioning rate in the up direction. For this purpose, the driving system is provided with a reversible traverse motor 15, and a positioning motor 16 which are energized in sequence during the head positioning cycle. These motors are interconnected with suitable gear trains to provide the desired traverse and positioning rates of motion. At the final position, a clamping motor 17 is energized. This motor is interconnected with a suitable clamping mechanism which clamps the drill head rigidly to the column at its new elevation. The drill head positioning transmission system is described later in detail.

As explained above, it is necessary to adjust the drill head to an elevation roughly approximating the several horizontal planes of the workpiece; however, the final limit of tool travel is determined precisely by the spindle control apparatus (Serial No. 51,023). Since the final position of the quill (depth control) is determined with reference to the drill head itself, it will be understood that the elevation of the drill head must be precisely regulated in order to provide precision depth control of the tool. In the present example, the drill head is raised or lowered in increments of one inch relative to the work surface. These increments are provided by a series of stacked gauges, which locate the drill head precisely at the selected elevation in multiples of one inch. The spindle control apparatus of Patent No. 3,100,406 determines the depth of the tool precisely with reference to the one-inch position of the drill head.

Positioning transmission system

The drill head 4 is provided with the traverse motor 15, positioning motor 16, and the clamping motor 17. These motors are mounted upon the transmission case 14 (FIGURES 1 and 2) which is bolted to one side of the drill head 4. The traverse motor 15 and positioning motor 16 both drive a common shaft through a differential gear train, the common shaft driving a pinion journalled in the gear head and meshing with a rack which is attached to the column 2, as explained later.

In general, the purpose of the differential gear train is to provide a driving connection from the two motors to the common input shaft 191 (FIGURE 3) without the use of clutches or other elements which would otherwise be required. The differential gear train provides the same gear ratio from the two motors to the input shaft 191. However, in order to drive the shaft 191 at the slow positioning rate, a speed reduction gear train is interposed between the positioning motor 16 and the differential gear train. The reduction gear train is conventional and is enclosed in the gear head 179 (FIGURE 2) forming part of the positioning motor 16.

Described in detail with reference to FIGURES 2, 3 and 4, the traverse motor 15 is coupled to a shaft 182 journalled in the transmission case 14 and having a worm 183 meshing with a worm wheel 184. The worm wheel 184 is keyed as at 185 to a traverse sleeve 186 which includes a traverse drive gear 187. The worm wheel 184 and sleeve 186 are mounted for rotation upon ball bearings 188—188. As explained later in detail, a positioning shaft 190 telescopically interfits the sleeve 186 and is mounted for rotation relative to the sleeve.

It will be understood at this point, that rotation of the worm wheel 184 and traverse sleeve 186 by the traverse motor 15 provides rapid traverse of the drill head, while rotation of the positioning shaft 190 relative to the sleeve 186 imparts motion to the head at the positioning rate. The differential transmission system is in driving connection with the common input shaft 191, which is co-axial with positioning shaft 190 and which includes a pinion 192 meshing with a rack 193 (FIGURE 3). Input shaft 191 is journalled in the drill head 4, while the rack 193 is attached to the column; hence rotation of the pinion 192 by the traverse motor 15 raises or lowers the head at a rapid rate. On the other hand, rotation of the pinion by the positioning motor 16 raises the drill head at the slow positioning rate.

The differential transmission system includes a differential cage 194 having one end journalled upon ball bearings 195 relative to the transmission case. The opposite end of the cage is journalled upon the ball bearings previously indicated at 188 of the sleeve 186, adapting the cage 194 to rotate relative to the sleeve 186 and also relative to the positioning shaft 190.

The transverse drive gear 187 of sleeve 186 meshes with a planetary gear 197 which is journalled upon a stub shaft 198 carried by the differential cage 194. The planetary gear 197 meshes with an idler gear 200 journalled on a second stub shaft mounted in the differential cage 194. The idler gear 200 meshes with a positioning drive gear 201, which is fixed to the positioning shaft 190.

Traverse drive

It will be understood that the positioning shaft 190 and its drive gear 201 remain locked in a stationary position (through a worm and wheel drive) while the traverse motor 15 (FIGURE 4) is energized, with the positioning motor 16 deenergized. Thus, rotation of the traverse worm wheel 184 rotates the sleeve 186 and traverse drive gear 187 in the direction indicated by the arrow A in FIGURE 4. Gear 187 in turn, tends to rotate the planetary gears 197 and 207. However, the planetary gear 197 meshes by way of the idler gear 200 with the stationary positioning drive gear 201. The companion planetary gear 207 (FIGURE 4) meshes by way of idler gear 208 with the stationary positioning drive gear 201 so as to balance the drive from drive gear 187 to the drive gear 201, which, as noted above, is keyed to the positioning shaft 190. Therefore, as the traverse drive gear 187 rotates, the planetary gear 197 and its idler 200 and companion gear 207 and the idler 208 rotate in an orbit about the gears 187 and 201, thus rotating the differential cage in the direction indicated by the arrow B in FIGURE 4. The shaft 191 includes a splined end portion 202 providing a keyed connection with the hub 203 of the different cage 194, thus rotating the shaft and its pinion 192 so as to raise or lower the head at the traverse rate. During the traverse operation, the positioning motor 16 is deenergized and the traverse motor 15 is energized, as indicated by the arrows in FIGURE 4.

Positioning drive

Figure 5:
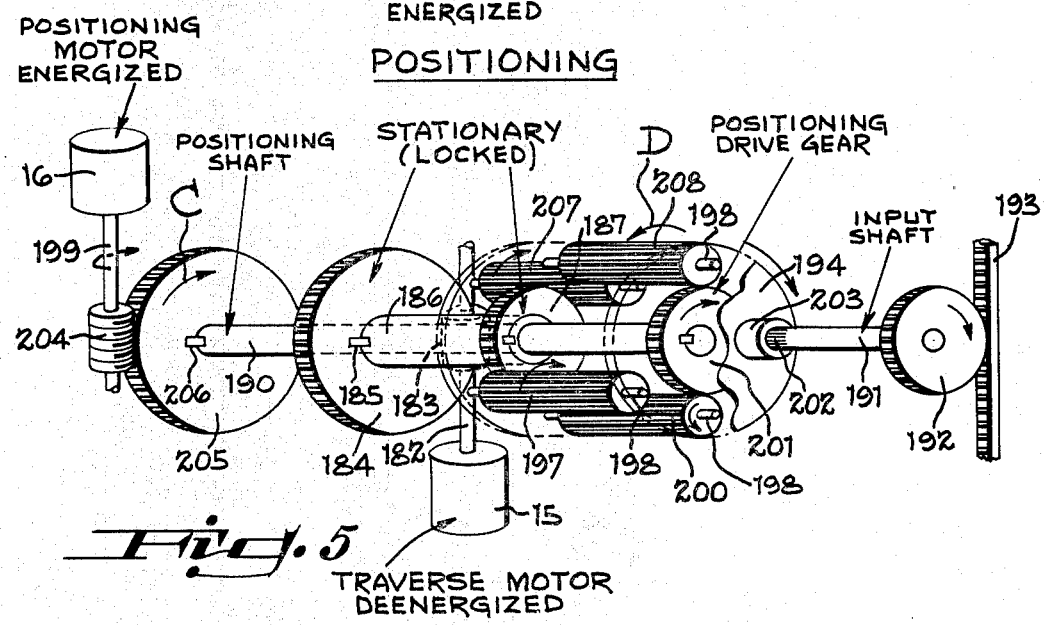
FIGURE 5 is a diagrammatic view similar to FIGURE 4 but showing the action of the differential gear transmission during the positioning operation.

The reduction gear head 179 of the positioning motor 16 drives a shaft 199 having a worm 204 meshing with a worm wheel 205 which is keyed as at 206 to the positioning shaft 190. When the positioning motor 16 is energized to rotate the worm wheel 205 and positioning shaft 190 as indicated by arrow C (with the traverse worm wheel 184 and its sleeve 186 locked in stationary position), then the positioning drive gear 201 of shaft 190 is rotated relative to the stationary differential cage 194. The positioning drive gear 201 meshes with the planetary gear 200, journalled in the differential cage upon a second stub shaft 198. Planetary gear 200 meshes with an idler planetary gear 197, which in turn meshes with the traverse drive gear 187 of sleeve 186 which is locked in stationary position. The planetary gear 208 is a companion to planetary gear 200 (FIGURE 5) and meshes with idler planetary gear 207 which is a companion to idler gear 197, noted above. Accordingly, the rotary motion of positioning drive gear 201 rotates planetary gear 207. Companion planetary gears 200 and 208 and planetary gears 197 and 207 are thus driven in an orbit and in the direction indicated by the arrow D in FIGURE 5. Hence the differential cage will be rotated at the positioning rate as provided by the gear head 179 of the positioning motor 16. The differential cage 194 thus rotates the input shaft 191 causing the head to be elevated at the positioning rate.

Figure 2:
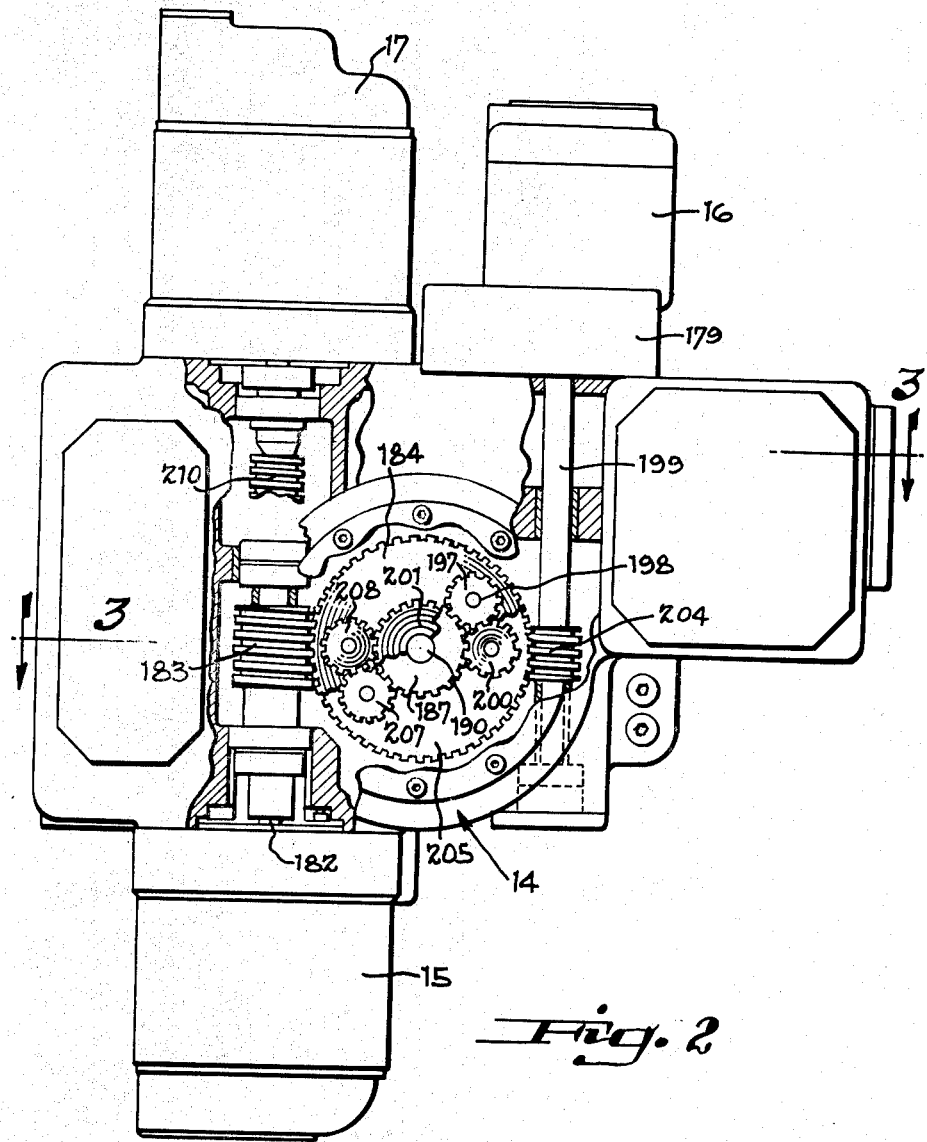
FIGURE 2 is a fragmentary side elevation as viewed along the line 2—2 of FIGURE 1, illustrating the differential transmission which raises and lowers the drill head.
Figure 3:
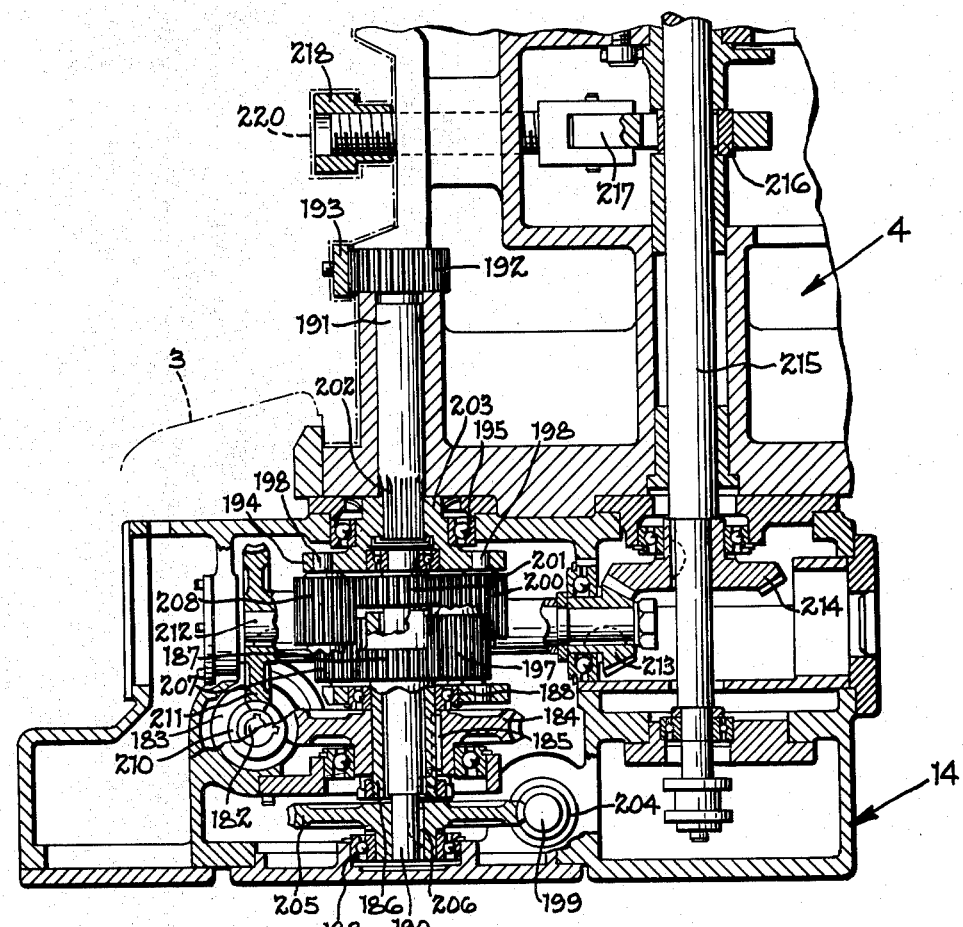
FIGURE 3 is a sectional view taken along line 3—3 of FIGURE 2, further illustrating the differential transmission and head driving system.
Figure 4:
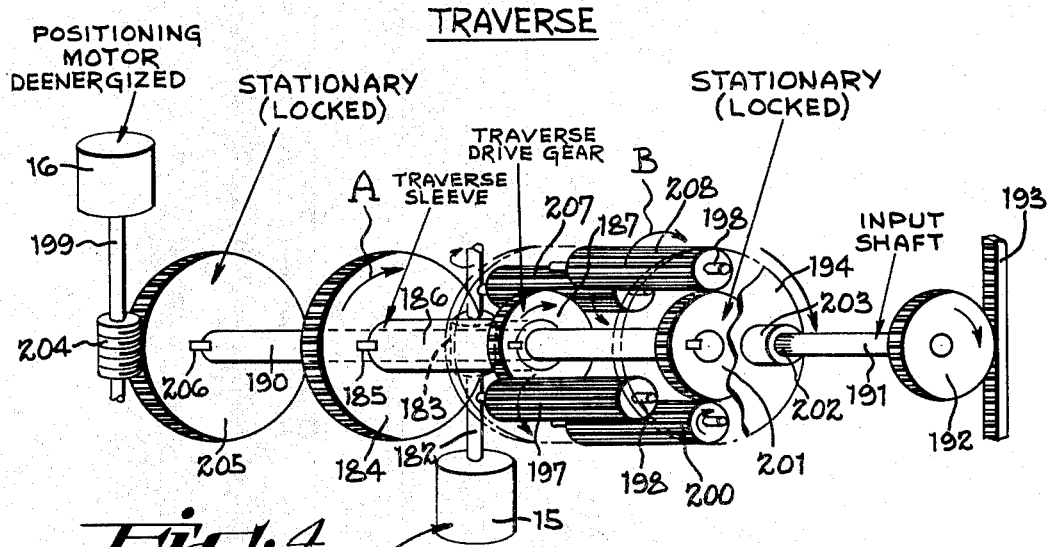
FIGURE 4 is a diagrammatic view illustrating the differential gear train during the traverse operation.

As shown in FIGURES 2 and 3, the clamp motor 17 is mounted in a position co-axial with the traverse motor 15, and its shaft includes a worm 210. Worm 210 meshes with a worm wheel 211 mounted on a vertical shaft, 212 which is journalled within the housing 14. The lower end of the vertical shaft includes a small bevel gear 213, meshing with a large bevel gear 214 which is keyed to a horizontal shaft 215. The horizontal shaft includes an eccentric 216 acting upon a yoke 217 which is adjustably connected to a clamp block 218. Block 218 traverses a vertical T-slot 220 formed in the column way 3. Rotation of the clamping motor in clamping direction draws the head firmly into clamping engagement with the column, while rotation in unclamping direction disengages the clamp block 218, permitting the drill head to be raised or lowered along the column ways.

Having described my invention, I claim:

1. In a drill head having an elevating mechanism including an input shaft, and having a rapid traverse motor and a positioning motor, a transmission system adapted to provide a driving connection from said motors individually to said input shaft comprising, a positioning shaft, a traverse sleeve mounted in axial alignment with said positioning shaft for rotation relative to said positioning shaft, a first self-locking worm and worm wheel drive connecting said positioning motor to said positioning shaft, a second self-locking worm and worm wheel drive connecting said traverse motor to said traverse sleeve, a differential cage mounted for rotation about the axis of said positioning shaft and traverse sleeve and in driving connection with said input shaft, respective traverse and positioning driving gears mounted on said positioning shaft and traverse sleeve, respective planetary gears journalled for rotation in said differential cage and meshing with said traverse and positioning driving gears, and respective idler gears journalled in the differential cage and meshing with the said planetary gears, said idler gears providing a driving connection between said respective traverse and positioning driving gears adapting the planetary gears and idler gears to rotate in an orbit about said driving gears and to impart rotary motion to the differential cage, whereby either the traverse motor or positioning motor is adapted to be energized to impart rotary motion to the input shaft through orbital rotation of the planetary gears and idler gears about the driving gears.

2. In a drill head having an elevating mechanism including an input shaft, and having a rapid traverse motor and a positioning motor, a transmission system adapted to provide a driving connection from said motors individually to said input shaft comprising, a positioning shaft, a traverse sleeve mounted on said positioning shaft for rotation relative to said positioning shaft, a first self-locking worm and worm wheel drive connecting said positioning motor to said positioning shaft, a second self-locking worm and worm wheel drive connecting said traverse motor to said traverse sleeve, a differential cage mounted for rotation about the axis of said positioning shaft and traverse sleeve and in driving connection with said input shaft, respective traverse and positioning drive gears mounted on said positioning shaft and traverse sleeve respective planetary gears journalled for rotation in said differential cage and meshing with said driving gears, and respective idler gears journalled in the differential cage and meshing with said planetary gears, said idler gears providing a driving connection between said respective traverse and positioning driving gears adapting the planetary gears and idler gears to be driven in an orbit about said driving gears and to impart rotary motion to the differential cage, whereby either the traverse motor or positioning motor is adapted to be energized to impart rotary motion to the input shaft through orbital rotation of the planetary gears and idler gears about the driving gears.

3. In a drill head having an elevating mechanism including an input shaft, and having a rapid traverse motor and a positioning motor, a transmission system adapted to provide a driving connection from said motors individually to said input shaft comprising, a positioning shaft, a traverse sleeve mounted on said positioning shaft for rotation relative to said positioning shaft, a first self-locking worm and worm wheel drive connecting said positioning motor to said positioning shaft, a second self-locking worm and worm wheel drive connecting said traverse motor to said traverse sleeve, a differential cage mounted for rotation about the axis of the positioning shaft and traverse sleeve and in driving connection with the said input shaft, a positioning drive gear keyed to the positioning shaft, a traverse drive gear keyed to the traverse sleeve, a positioning planetary gear journalled in the differential cage and meshing with the positioning drive gear, a traverse planetary gear journalled in the differential cage and meshing with the traverse drive gear, a first idler gear journalled in the differential cage and meshing in common with the positioning planetary gear and traverse driving gear, a second idler gear journalled in the differential cage and meshing in common with the traverse planetary gear and positioning drive gear, said planetary gears and idler gears adapted to react against the positioning drive gear when the traverse motor is energized with the positioning motor deenergized, said planetary and idler gears adapted to react against the traverse drive gear when the positioning motor is energized with the traverse motor deenergized, whereby, energization of the traverse motor or positioning motor drives one of the planetary gears and its idler gear in an orbit about one of the drive gears to impart rotary motion to the differential cage and input shaft, thereby to impart motion to the head.

References Cited by the Examiner
UNITED STATES PATENTS

| 2,779,213 | 1/1957 | Fell et al. | 74—675 |
| 3,127,791 | 4/1964 | Roe | 74—675 |

FOREIGN PATENTS 918,208 10/1946 France.

DON A. WAITE, *Primary Examiner.*